US011487707B2

(12) United States Patent
Victor

(10) Patent No.: US 11,487,707 B2
(45) Date of Patent: Nov. 1, 2022

(54) EFFICIENT FILE PATH INDEXING FOR A CONTENT REPOSITORY

(75) Inventor: David Brian Victor, Gilroy, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 13/460,391

(22) Filed: Apr. 30, 2012

(65) Prior Publication Data

US 2013/0290301 A1 Oct. 31, 2013

(51) Int. Cl.
*G06F 16/13* (2019.01)

(52) U.S. Cl.
CPC .................................... *G06F 16/13* (2019.01)

(58) Field of Classification Search
CPC ......... G06F 17/30864; G06F 17/30867; G06F 17/30991; G06F 17/30696; G06F 17/30321; G06F 17/30327; G06F 17/30091; G06F 16/13; G06Q 30/02
USPC .......................................................... 707/722
See application file for complete search history.

(56) References Cited

U.S. PATENT DOCUMENTS 6,067,541 A * 5/2000 Raju ........................ G06F 16/10
6,330,567 B1 * 12/2001 Chao ............................. 707/758
6,427,123 B1 * 7/2002 Sedlar ................... G06F 16/284 702/2
6,654,734 B1 * 11/2003 Mani ................. G06F 17/30861
6,920,458 B1 * 7/2005 Chu .................... G06F 16/2465 707/600
7,383,276 B2 6/2008 Lomet
7,584,460 B2 * 9/2009 Broberg et al. ............... 717/143
7,660,808 B2 2/2010 Brechner et al.
7,769,744 B2 8/2010 Waas et al.

(Continued)

FOREIGN PATENT DOCUMENTS

EP 1826692 A2 8/2007
WO 2008063275 A2 5/2008

OTHER PUBLICATIONS

Paul Lensing et al., "hashFS: Applying Hashing to Optimize File Systems for Small File Reads," 2010 International Workshop on Storage Network Architecture and Parallel I/Os, IEEE, pp. 33-42 (May 3, 2010).

(Continued)

*Primary Examiner* — Usmaan Saeed
*Assistant Examiner* — Jessica N Le
(74) *Attorney, Agent, or Firm* — Konrad Raynes Davda & Victor LLP; David W. Victor

(57) ABSTRACT

Techniques for indexing file paths of items in a content repository may include querying, by at least one processor, a content repository stored on at least one computer readable storage medium for one or more items that qualify for file path indexes, do not have the file path indexes, and have a parent folder that has a file path index, wherein the querying does not depend on results from previous queries, and wherein the file path index indicates an associated item's location in a folder tree, creating, by the at least one processor, the file path indexes for resulting items from the querying, and, if the querying results in at least one resulting item, repeating the querying of the content repository and the creating of the file path indexes until the querying results in zero resulting items.

18 Claims, 7 Drawing Sheets

START
QUERY FOR ROOT FOLDERS AND UNFILED FOLDER TREES — 152
CREATE FILE PATH INDEXES FOR ITEMS RESULTING FROM THE QUERY — 154
QUERY FOR ITEMS THAT QUALIFY FOR FILE PATH INDEXES, DO NOT HAVE FILE PATH INDEXES, AND HAVE A PARENT FOLDER THAT HAS A FILE PATH INDEX — 156
CREATE FILE PATH INDEXES FOR ITEMS RESULTING FROM THE QUERY — 158
DID THE QUERY RETURN ONE OR MORE ITEMS? — 160
YES
NO
END

(56) References Cited

U.S. PATENT DOCUMENTS 7,770,123 B1* 8/2010 Meyer .................... G06F 9/453 715/760
7,831,591 B2 11/2010 Masuda
7,873,262 B2 1/2011 Shibata et al.
8,015,165 B2* 9/2011 Idicula et al. ................ 707/695
8,037,054 B2 10/2011 Brawer et al.
8,126,944 B2 2/2012 McArdle
8,401,522 B2 3/2013 Crawford et al.
8,495,619 B2 7/2013 Tammana
8,914,356 B2 12/2014 Victor
9,323,761 B2 4/2016 Victor
2002/0083054 A1* 6/2002 Peltonen ............. G06F 16/9535
2004/0024778 A1* 2/2004 Cheo .......................... 707/104.1
2004/0088306 A1* 5/2004 Murthy .................. G06F 16/10
2004/0133564 A1* 7/2004 Gross .................... G06F 16/332
2004/0168084 A1* 8/2004 Owen ............... G06F 17/30566 726/26
2005/0022155 A1* 1/2005 Broberg et al. ............... 717/101
2005/0050107 A1* 3/2005 Mane et al. .................. 707/200
2005/0165760 A1 7/2005 Seo
2005/0228791 A1* 10/2005 Thusoo et al. .................... 707/6
2005/0246310 A1 11/2005 Chang et al.
2006/0064412 A1* 3/2006 Cunningham et al. ........... 707/3
2006/0074964 A1* 4/2006 Pallapotu .......... G06F 17/30091
2006/0095446 A1* 5/2006 Butler ..................... G06F 16/81
2006/0161591 A1 7/2006 Huang et al.
2006/0167928 A1* 7/2006 Chakraborty ....... G06F 17/2205
2006/0212457 A1* 9/2006 Pearce et al. ................. 707/100
2007/0006217 A1 1/2007 Tammana
2007/0073663 A1* 3/2007 McVeigh .......... G06F 17/30477
2007/0118561 A1* 5/2007 Idicula et al. ............. 707/104.1
2007/0136382 A1* 6/2007 Idicula ................ G06F 16/2458
2007/0150434 A1* 6/2007 Takakura ........... H04N 1/00411
2007/0156842 A1* 7/2007 Vermeulen ........ H04L 29/06047 709/217
2007/0168327 A1* 7/2007 Lindblad et al. ................. 707/2
2007/0168363 A1* 7/2007 Inaba et al. ................... 707/100
2007/0203875 A1* 8/2007 Cave et al. ....................... 707/1
2007/0226235 A1* 9/2007 Fuh ................... G06F 17/30371
2007/0233647 A1* 10/2007 Rawat ................. G06F 21/6218
2007/0276807 A1* 11/2007 Chen et al. ....................... 707/3
2008/0046457 A1* 2/2008 Haub et al. ................... 707/102
2008/0071805 A1* 3/2008 Mourra et al. ................ 707/100
2008/0114803 A1* 5/2008 Chinchwadkar et al. ..... 707/102
2008/0147614 A1* 6/2008 Tam .................... G06F 16/8373
2008/0177701 A1* 7/2008 Merritt .................... G06F 16/13
2008/0195635 A1 8/2008 Chand et al.
2008/0235252 A1* 9/2008 Sakai ................ G06F 17/30911
2008/0256090 A1* 10/2008 Dietterich ............. G06F 9/5016
2008/0313155 A1 12/2008 Atchison et al.
2008/0313260 A1 12/2008 Sweet et al.
2009/0112911 A1* 4/2009 Chu ............................. 707/102
2009/0187581 A1 7/2009 Delisle et al.
2009/0187797 A1* 7/2009 Raynaud-Richard ........................ G06Q 10/10 714/57
2010/0010967 A1* 1/2010 Muller .............................. 707/3
2010/0100544 A1* 4/2010 Takeuchi et al. ............. 707/736
2010/0161570 A1* 6/2010 Novak ............. G06F 17/30017 707/696
2010/0257153 A1 10/2010 Day et al.
2010/0257179 A1* 10/2010 Arrouye .................. G06F 16/13 707/812
2011/0078186 A1* 3/2011 Li et al. ........................ 707/771
2011/0119283 A1* 5/2011 Tarachandani .... G06F 16/24547 707/E17.014
2011/0145216 A1 6/2011 Subramanya
2011/0161291 A1 6/2011 Taleck et al.
2011/0161723 A1 6/2011 Taleck et al.
2012/0016851 A1 1/2012 Hrle et al.
2012/0096036 A1 4/2012 Ebaugh et al.
2012/0158689 A1* 6/2012 Doshi ................... G06F 16/148 707/706
2012/0166425 A1* 6/2012 Sharma ............. G06F 17/30011 707/722
2012/0166513 A1* 6/2012 Fortune ................... G06F 16/13 709/201
2012/0173511 A1* 7/2012 Eto ....................... G06F 17/301 707/711
2012/0179689 A1* 7/2012 Hornkvist ............. H04L 41/046 707/E17.037
2012/0216260 A1 8/2012 Crawford et al.
2012/0254189 A1* 10/2012 Shah ................ G06F 17/30625 707/741
2013/0066929 A1* 3/2013 Sedlar et al. ................. 707/822
2013/0086127 A1* 4/2013 Pogmore ............... H04L 9/0869 707/803
2013/0103693 A1* 4/2013 Arikuma ............... G06F 16/316 707/741
2013/0138629 A1* 5/2013 Rehmattullah ............... 707/715
2013/0290301 A1 10/2013 Victor
2013/0302015 A1 11/2013 Dini et al.
2014/0109082 A1 4/2014 Kimmet et al.
2014/0181116 A1 6/2014 Wang

OTHER PUBLICATIONS ip.com et al.; "System and Method for Just-In-Time (JIT) Indexing", IPCOM000214355D, Jan. 22, 2012 (4 pages).
Cabanac et al, "An Original Usage-based Metrics for Building a Unified View of Corporate Documents," DEXA'07: Proceedings of the 18th International Conference on Database and Expert Systems Applications, vol. 4653 of LNCS, pp. 202-212, 2007.
U.S. Appl. No. 13/666,798, by David B. Victor, filed Nov. 1, 2012.
U.S. Appl. No. 13/708,684, by David B. Victor, filed Dec. 7, 2012.
Notice of Allowance from U.S. Appl. No. 13/708,684, dated Jan. 29, 2016, 13 pp.

* cited by examiner

EFFICIENT FILE PATH INDEXING FOR A CONTENT REPOSITORY

TECHNICAL FIELD

The invention relates to data storage, and more specifically relates to file paths of items in folder trees.

BACKGROUND

Documents and content stored as files in a content repository may be logically represented as a folder tree, where each file in the content repository may be associated with and accessed by a file path that specifies a unique location of the file in the content repository. In some examples, the content repository may maintain an index for the file paths of the files in the content repository (referred to as a "file path index"), so that the file path of a file in the content repository may be quickly determined instead of having to be determined on the fly when retrieving or otherwise accessing a file. As files are created, deleted, moved, and otherwise modified in the content repository, it may be necessary to update the file path index for the content repository.

SUMMARY

In general, techniques are described for creating and updating file path indexes for files that are represented as a folder tree in a content repository. Instead of crawling the folder tree to create and update file path indexes of files in the folder tree, which may be too resource intensive in an enterprise environment requiring high performance, high scaling, high stress, high load, and many users, the techniques disclosed herein may visit select nodes of the folder tree to update and maintain the file path indexes. For example, an optimized indexer is described that may, for example, visit only nodes within the folder tree that are missing indexes, or visit only directories which contain children missing indexes. This may significantly reduce or completely eliminate cost of visiting nodes that are already indexed or visiting nodes in the part of the content repository that should not be optimized for paths or indexed. In this way, the efficiency of identifying files without file path indexes and creating file path indexes for those files within the folder tree hierarchy may be improved.

In some examples, the content repository may be accessed via a services layer. The services layer may maintain the file path indexes for the files in the content repository so that a file path for a file in a folder tree may be quickly looked up. The services layer may create or update the file path indexes based on changes made to files in the content repository by applications accessing the content repository through the services layer. However, in some computing environments, certain applications may directly access the content repository without using the services layer to create, delete, move, or otherwise modify the files in the content repository, thereby causing the file path indexes maintained in the services layer to become out-of-date. As described, the techniques may be used, for example, to optimally update the file path indexes maintained by the services layer and to determine whether any files in the content repository do not have an associated file path index maintained by the services layer.

In accordance with the techniques described herein, an indexer may periodically determine whether any files in the content repository qualify for an associated file path index but do not have an associated file path index, and may create file path indexes for those unindexed files.

In one aspect, the disclosure is directed to a method for indexing file paths of items in a content repository. The method may include querying, by at least one processor, a content repository stored on at least one computer readable storage medium for one or more items that qualify for file path indexes, do not have the file path indexes, and have a parent folder that has a file path index, wherein the file path index indicates an associated item's location in a folder tree. The method may also include creating, by the at least one processor, the file path indexes for resulting items from the querying.

In another aspect, the disclosure is directed to a computing system. The computing system may include one or more processors. The computing device may also include an indexer operable on the one or more processors and configured to: query a content repository for one or more items that qualify for file path indexes, do not have the file path indexes, and have a parent folder that has a file path index, wherein the file path index indicates an associated item's location in a folder tree, and create the file path indexes for resulting items from the querying.

In another aspect, the disclosure is directed to a computer readable storage medium containing instructions. The instructions, when executed on at least one programmable processor, may cause the at least one programmable processor to perform operations. The operations may include querying, by at least one processor, a content repository stored on at least one computer readable storage medium for one or more items that qualify for file path indexes, do not have the file path indexes, and have a parent folder that has a file path index, wherein the file path index indicates an associated item's location in a folder tree. The operations may further include creating, by the at least one processor, the file path indexes for resulting items from the querying.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1A:
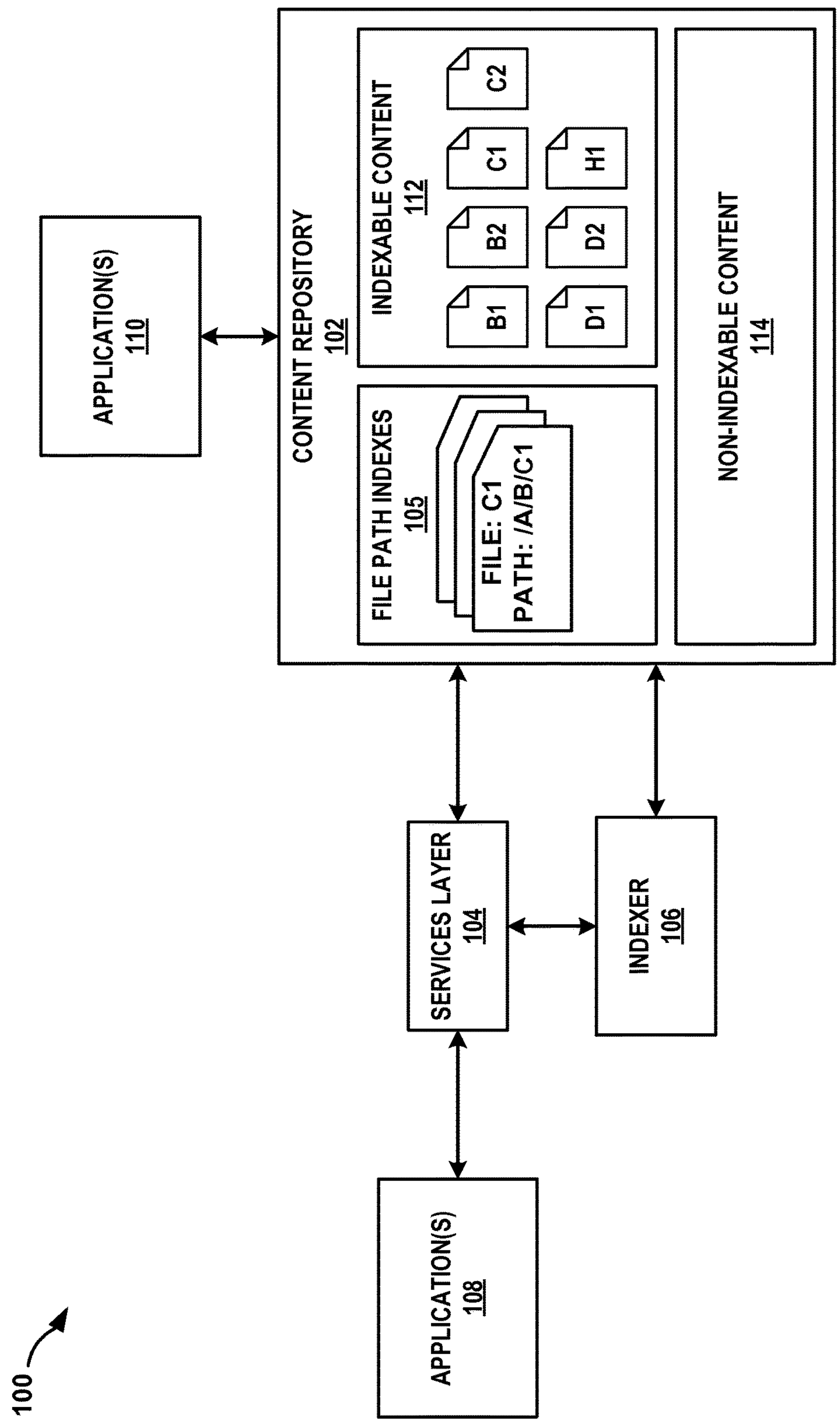
FIG. 1A is a block diagram illustrating a computing system including a content repository according to some aspects of the disclosure.

FIG. 1A is a block diagram illustrating a computing system including a content repository according to some aspects of the disclosure. In the example of FIG. 1A, computing system 100 includes content repository 102, services layer 104, indexer 106, one or more applications 108 that interact with content repository 102 via services layer 104, and one or more applications 110 that bypass services layer 104 and interact directly with content repository 102.

Computing system 100 may be made up of one or more computing devices that each includes one or more programmable processors. In some examples, computing system 100 is a part of an enterprise environment. Content repository 102, services layer 104, indexer 106, one or more applications 108, and one or more applications 110 may be operable on one or more computing devices. In some examples, a single computing device comprises content repository 102, services layer 104, indexer 106, one or more applications 108, and one or more applications 110. In some other examples, content repository 102, services layer 104, indexer 106, one or more applications 108, and one or more applications 110 are spread out over a plurality of computing devices.

Content repository 102 may be an enterprise repository that includes one or more data stores for storing documents or other digital content in computing system 100 as files on one or more computer readable storage media. In some examples, content repository 102 is organized into a hierarchy of folders and may natively support file paths or folder trees for accessing files stored within the folders. In some examples, content repository 102 is based on a relational database that receives queries and returns one or more files based on the queries.

In some environments, content repository 102 may include indexable content 112 and non-indexable content 114. Indexable content 112 may include items that may be represented hierarchically as part of one or more folder trees by services layer 102. Items in indexable content 112 may have an associated file path index in file path indexes 105 so that the items may be uniquely identified by a file path of the item in a folder tree. In some examples, file path indexes 105 is stored in content repository 102, and may be considered a part of non-indexable content 114. Conversely, non-indexable content 114 may include items that are not represented as folder trees by services layer 102. For example, non-indexable content 114 includes e-mail archives or e-mail inboxes that are not typically represented hierarchically as a folder tree.

Services layer 102 may be operably coupled to content repository 102 and may provide one or more software services and interfaces to software applications, such as one or more applications 108, for accessing items stored in content repository 102. In some examples, the services and interfaces provided by services layer 102 includes an application programming interface (API) that applications may use to access data stored in content repository 102. In some examples, services layer 102 provides web services that applications use to access data stored in content repository 102.

Services layer 102 may abstract the items in indexable content 112 of content repository 102 for one or more applications 108 so that they may appear as a part of one or more folder trees. For example, services layer 102 may maintain file path indexes 105 that includes a file path index indicating the file path for each item in a folder tree in indexable content 112. For example, as shown in FIG. 1A, file path indexes 105 may include a file path index for file "C1" indicating a file path of "/A/B/C1", thereby indicating that file C1 may be contained in folder B, which may be contained in folder A, which may be at the root folder of a folder tree. The services and interfaces provided by services layer 102, for example, enables one or more applications 108 to specify an item in indexable content 112 by a file path that uniquely identifies the item in the folder tree.

One or more applications 110 may also directly access content repository 102 without use of services layer 104, and may directly create, delete, move, or otherwise modify files in content repository 102 without using or notifying services layer 104. Thus, file path indexes 105 maintained by services layer 104 can become out-of-date if one or more applications 110 add, delete, move, or otherwise modify items in indexable content 112. For example, one or more applications 110 may directly create a new file under a pre-existing folder in a folder tree, or may move a file from one folder to another folder in a folder tree.

Indexer 106 may be operably coupled to content repository 102 and services layer 104, and may index items in indexable content 112 in content repository 102. Indexer 106 may determine items in indexable content 112 that do not have associated file path indexes 105, and creating file path indexes for those items. If content repository 102 is queryable, such as by being a relational database, indexer 106 may determine items in indexable content 112 that do not have associated file path indexes 105 by sending queries to content repository 102.

For example, indexer 106 may send a query to content repository 102 for one or more items that qualify for file path indexes, such as items stored in indexable content 112, do not have file path indexes in file path indexes 105 and have a parent folder that has a file path index in file path indexes 105. Content repository 102 may receive the query from file path indexes 105, perform the query, and return a query result to indexer 106. The query result may indicate one or more resulting items that met all of the requirements of the query. In response, indexer 106 may create file path indexes for resulting items from the querying and may store each file path index in file path indexes 105.

If the querying by indexer 106 results in at least one resulting item, indexer 106 may repeat the querying and the creating of file path indexes for resulting items returned from the query that met all of the requirements of the query until the querying results in zero resulting items that met all of the requirements of the query. Because a single query returns a single level of items without associated file path indexes at a time, the query may be performed multiple times in order to return multiple levels of items without associated file path indexes, as will be discussed in further detail below with respect to FIGS. 2A-2D. Furthermore, instead of visiting every node of folder trees in content repository 102 in order to determine unindexed items of the folder trees, in some examples only directories that contain unindexed items and the unindexed items themselves in the folder trees may be visited due to the queries, thereby minimizing the number of already-indexed items that are revisited due to the queries.

In some examples, indexer 106 initially queries content repository 102 for root folders and unfiled folder trees that qualify for the file path indexes and do not have the file path indexes. This query may be different from the query described above because root folders and folder trees do not have parent directories, and thus the previous query may not return unfiled root folders and unfiled folder trees that qualify for the file path indexes and do not have the file path indexes.

As can be seen, the queries issued by indexer 106 may stand on its own. Furthermore the queries issued by indexer 106 may also not rely on created dates or last modified timestamps of the items in content repository 102. Indexer 106 may periodically issue queries to content repository 102 to keep file path indexes 105 up-to-date. In some examples, an enterprise administrator may manually cause indexer 106 to issue queries to content repository 102. In some examples, indexer 106 may automatically issue queries on a periodic basis.

Figure 1B:
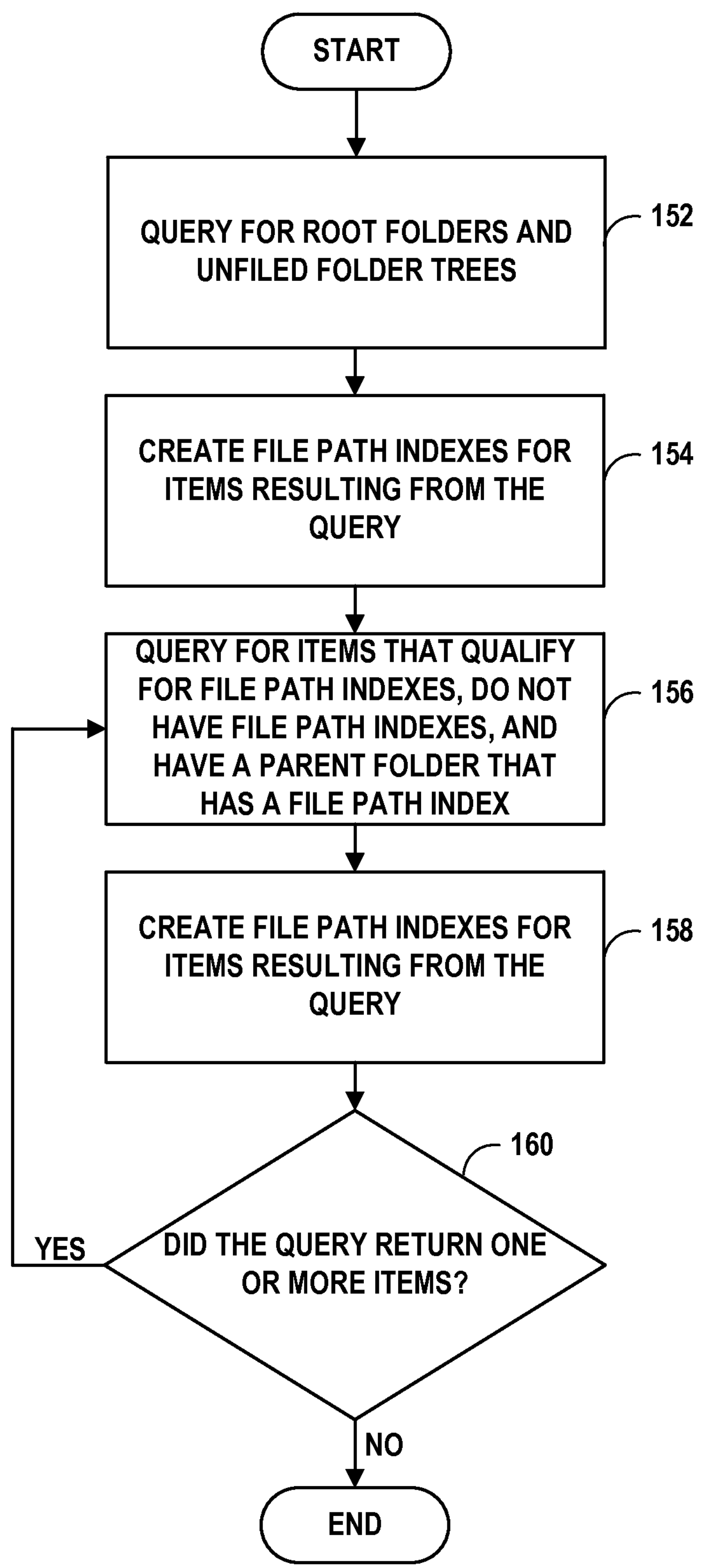
FIG. 1B is a flowchart illustrating an example method for querying and creating file path indexes according to some aspects of the disclosure.

FIG. 1B is a flowchart illustrating an example method for creating and maintaining file path indexes according to some aspects of the disclosure. As shown in FIG. 1B, because an unindexed root folder of a folder tree may cause items in the corresponding root tree to also not be index, indexer 106 may query content repository 102, for root folders of folder trees that qualify for file path indexes but do not have associated file path indexes as well as unfiled folder trees (152). The query can be optional in certain instances, such as if indexer 106 is already certain that all root folders have been indexed and that there are no unfiled folder trees. In one example, the following XPath code is implemented to perform the query 152: (/C1bLibraryGroup|/C1bLibrary)[NOT./REFERENCEDBY/@REFERENCER=>C1bPathIndex]

After the querying 152, indexer 106 may create file path indexes in file path indexes 105 for items resulting from the query 152 (154). Subsequently, indexer 106 may query the content repository for items that (1) quality for file path indexes, (2) are not associated with file path indexes, and (3) have a parent folder that is associated with a file path index (156). The query 156 can find unindexed items at different levels of a folder tree as long as the item has an indexed parent folder because the query 152 queries content repository 102 for all items in content repository 102 that meet the three conditions of the query 152 without regards as to the level each of those items are at in the folder tree, as opposed to some techniques that traverse the folder tree a level at a time. In some examples, the query 156 may query for the indexed parent folders, or the paths of the indexed parent folders, of unindexed items instead of the unindexed items. In one example, the following XPath code is implemented to perform the query 156: /C1bPathIndex[@c1bIndexedItem=>*[./OUTBOUNDLINK[@LINKTYPE="DKFolder"]/@TARGETITEMREF=>*[NOT @ITEMID=/C1bPathIndex/@c1bIndexedItem.RTARGETITEMID]]]

Indexer 106 may create file path indexes in file path indexes 105 for those items resulting from the query 156 (158). If the query 156 returns the indexed parent folders of unindexed items or the paths of the indexed parent folders of unindexed items, indexer 156 may create file path indexes for the unindexed child items of those parent folders. Because the query 156 queries for unindexed files having an indexed parent folder, the query 156 may not be able find unindexed items that are contained in an unindexed parent folder. In order to find and index multiple levels of unindexed items, the query 156 may be performed multiple times. As long as the query 156 returns an unindexed item, the query 156, should be performed again because that unindexed item may be an unindexed folder that may contain one or more unindexed items. Thus, if the query 156 returned one or more items, then indexer 106 may repeat the query 156 and the creation of file path indexes 158 until the query 156 returns zero items (160). The query 156 returning zero items signifies that no unindexed items was found, and thus provides an indication that the method can now end.

Figure 2A:
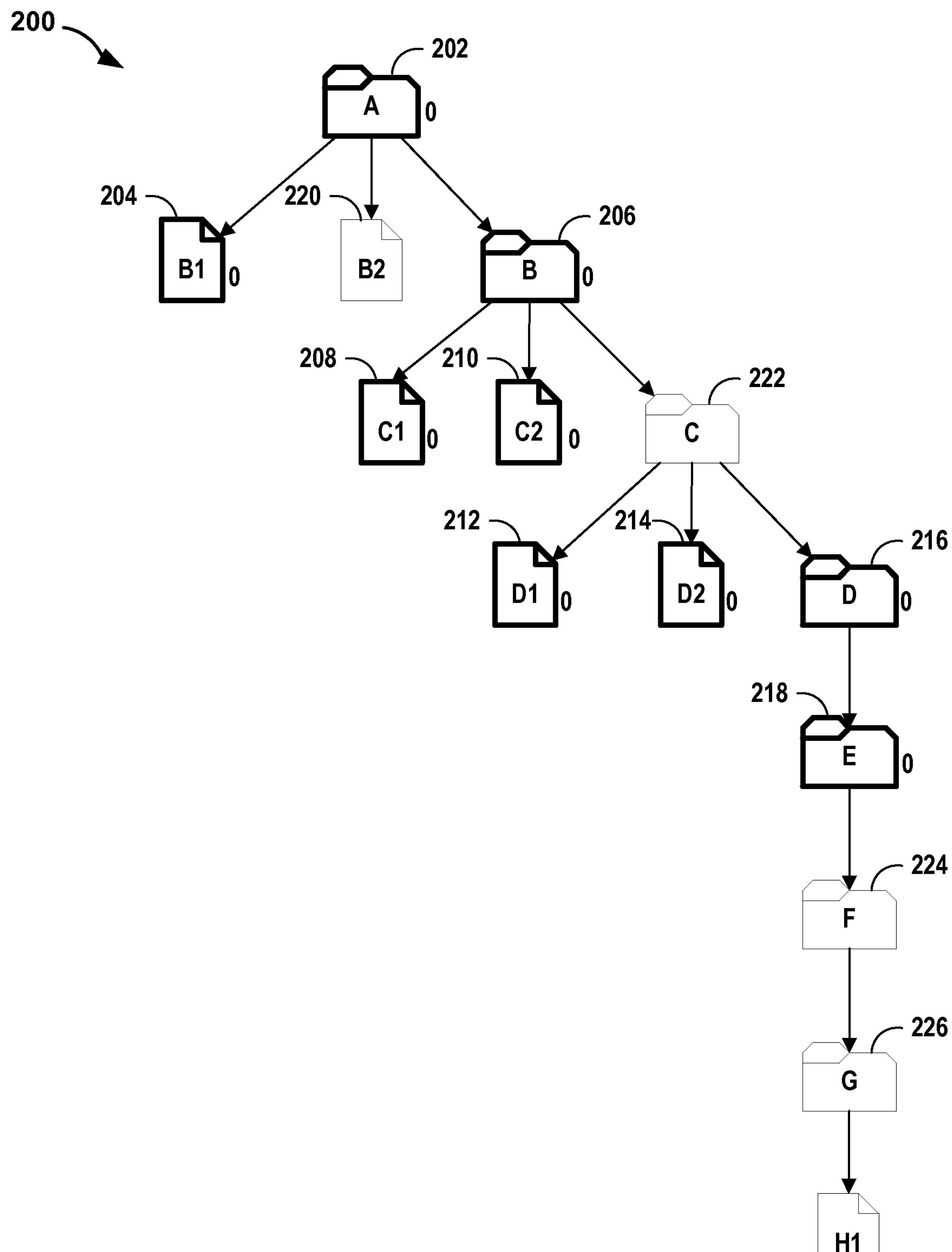
FIGS. 2A-2D are conceptual diagrams illustrating an example technique for indexing files in a folder tree according to aspects of the disclosure.

FIGS. 2A-2D are conceptual diagrams illustrating an example technique for indexing files in a folder tree by an example indexer, such as indexer 106 shown in FIG. 1A, according to aspects of the disclosure. As shown in FIG. 2A, folder tree 200 includes files and directories arranged hierarchically, so that a folder may contain files and directories, and those directories may contain files and directories, and so on.

Folder A 152, file B1 154, folder B 156, file C1 158, file C2 160, file D1 212, file D2 214, folder D 216, and folder E 218 each already have an associated file path index, and thus are considered to be indexed. An example indexer, such as indexer 106, determines whether there are any items that qualify for a file path index but do not have a file path index, and creates file path indexes for files that do not have a file path index.

The indexer may determine whether there are any root folders or unfiled folder trees that qualify for file path indexes but do not have associated file path indexes. An unfiled folder tree may be a folder tree whose nodes do not have associated file path indexes. In the example shown in FIG. 2A, root folder A 202 does have an associated path index, and there are not any other root folders or folder trees.

The indexer then determines if any items in folder tree 200 (1) qualify for file path indexes, (2) do not have file path indexes, and (3) have a parent folder that is associated with a file path index, and file B2 220, folder C 222, and folder F 224 are the resulting items that meet those three conditions, and thus are considered to be unindexed.

As can be seen, items in different levels of folder tree 200, such as file B2 220 in level one of folder tree 200, folder C 222 in level 2 of folder tree 200, and folder F 224 in level 5 of folder tree 200, are be returned as a result of the query. Furthermore, a single query is limited to finding unindexed items that are no more than a single level below an index folder. For example, before the query described above, unindexed folder G 226 is contained in unindexed folder F 224. The query finds folder F 224 for indexing because folder F 224 is a single level below index folder E 218, but does not find unindexed folder G 226 because folder G 226's parent folder F 224 was also unindexed, and folder G 226 is more than one level below indexed folder E 218.

Figure 2B:
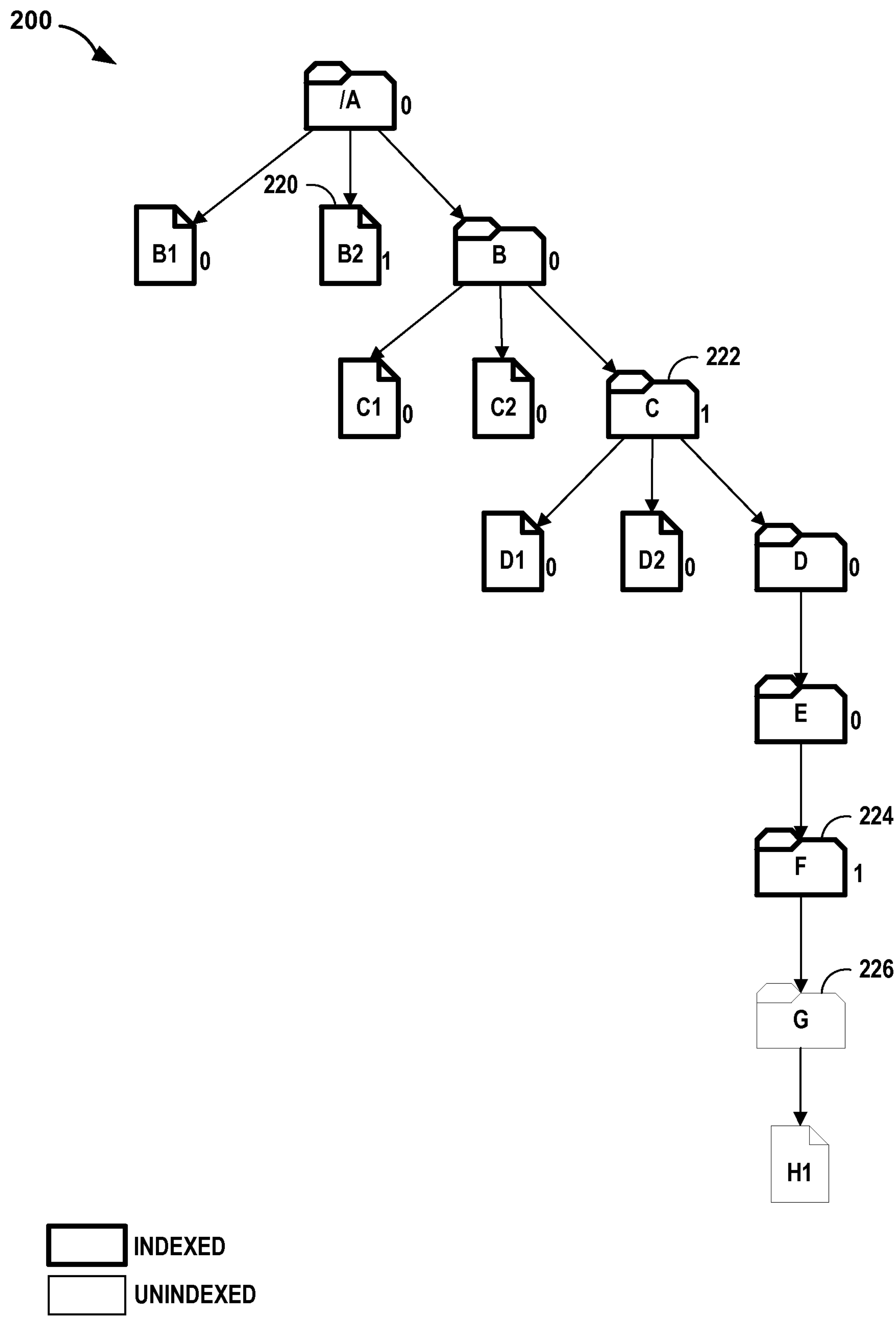

As shown in FIG. 2B, file path indexes are created for file B2 220, folder C 222, and folder F 224. Because the indexer determined that at least one file or folder met the conditions, the indexer again determines if any items in folder tree 200 (1) qualify for file path indexes, (2) do not have file path indexes, and (3) have a parent folder that is associated with a file path index, and folder G 226 is a resulting item that meets those three conditions.

Figure 2C:
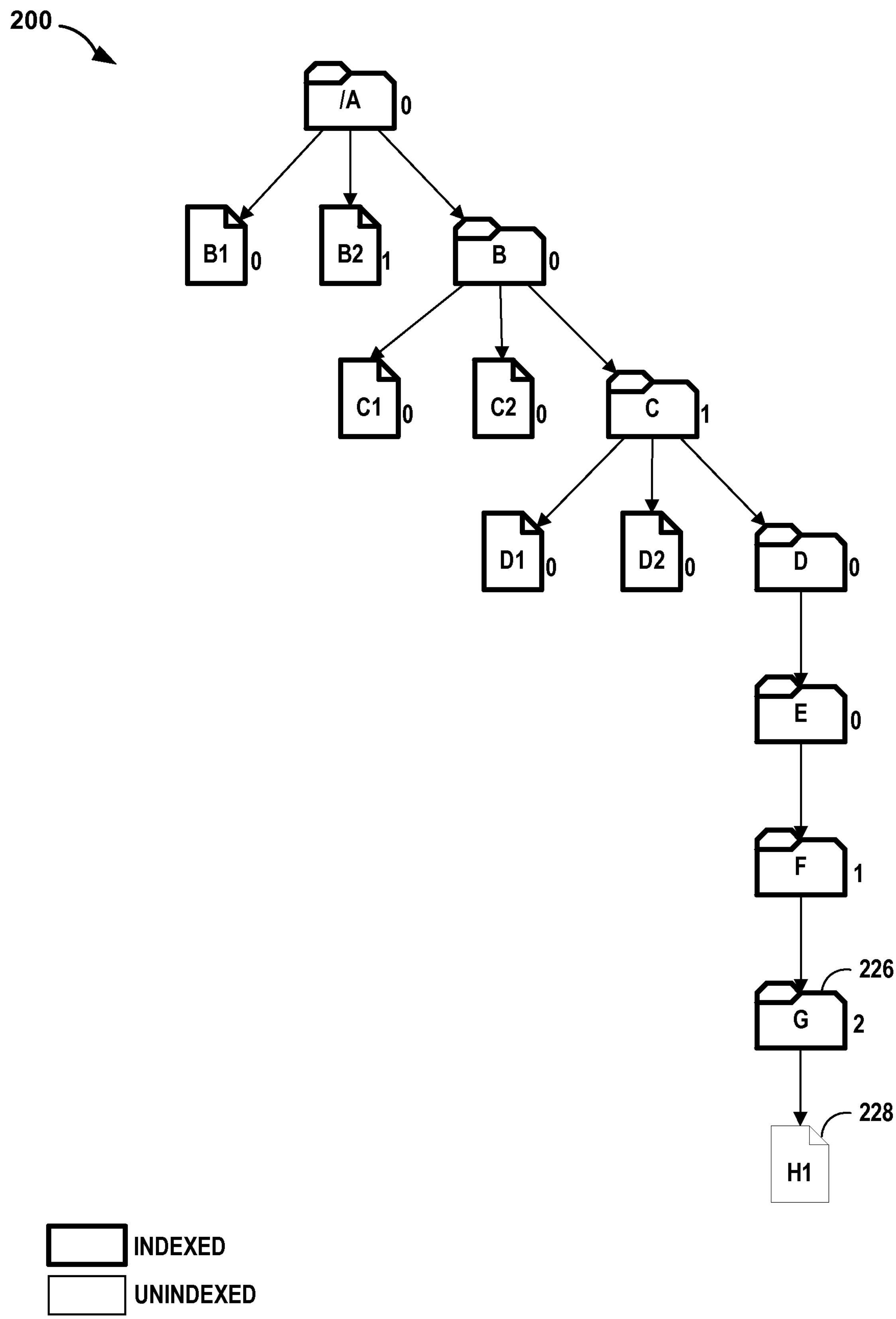

As shown in FIG. 2C, a file path index is created for folder G 226. Because the indexer determined that at least one file or folder met the conditions of the query by the indexer, the indexer again determines if any items in folder tree 200 (1) qualify for file path indexes, (2) do not have file path indexes, and (3) have a parent folder that is associated with a file path index, and file H 228 is a resulting item that meets those three conditions.

Figure 2D:
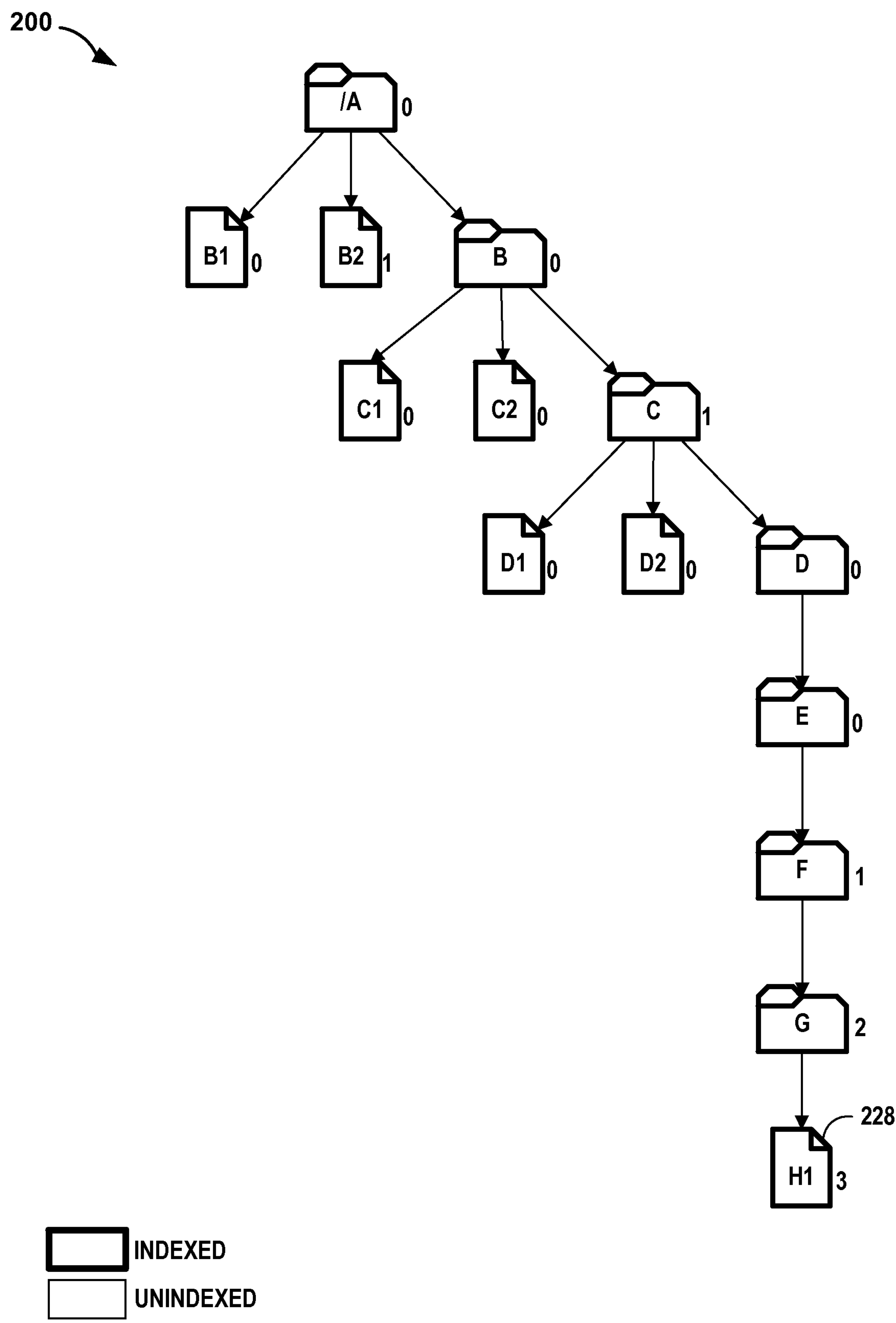

As shown in FIG. 2D, a file path index is created for file H 228. Because the indexer determined that at least one file or folder met the conditions, the indexer again determines if any items in folder tree 200 (1) qualify for file path indexes, (2) do not have file path indexes, and (3) have a parent folder that is associated with a file path index. Because every item in folder tree 200 is now associated with a file path index, the indexer determines that there are no items left in folder tree 200 that require the indexer to create an associated file path index. Thus, the process terminates because there are no more unindexed items to index.

Figure 3:
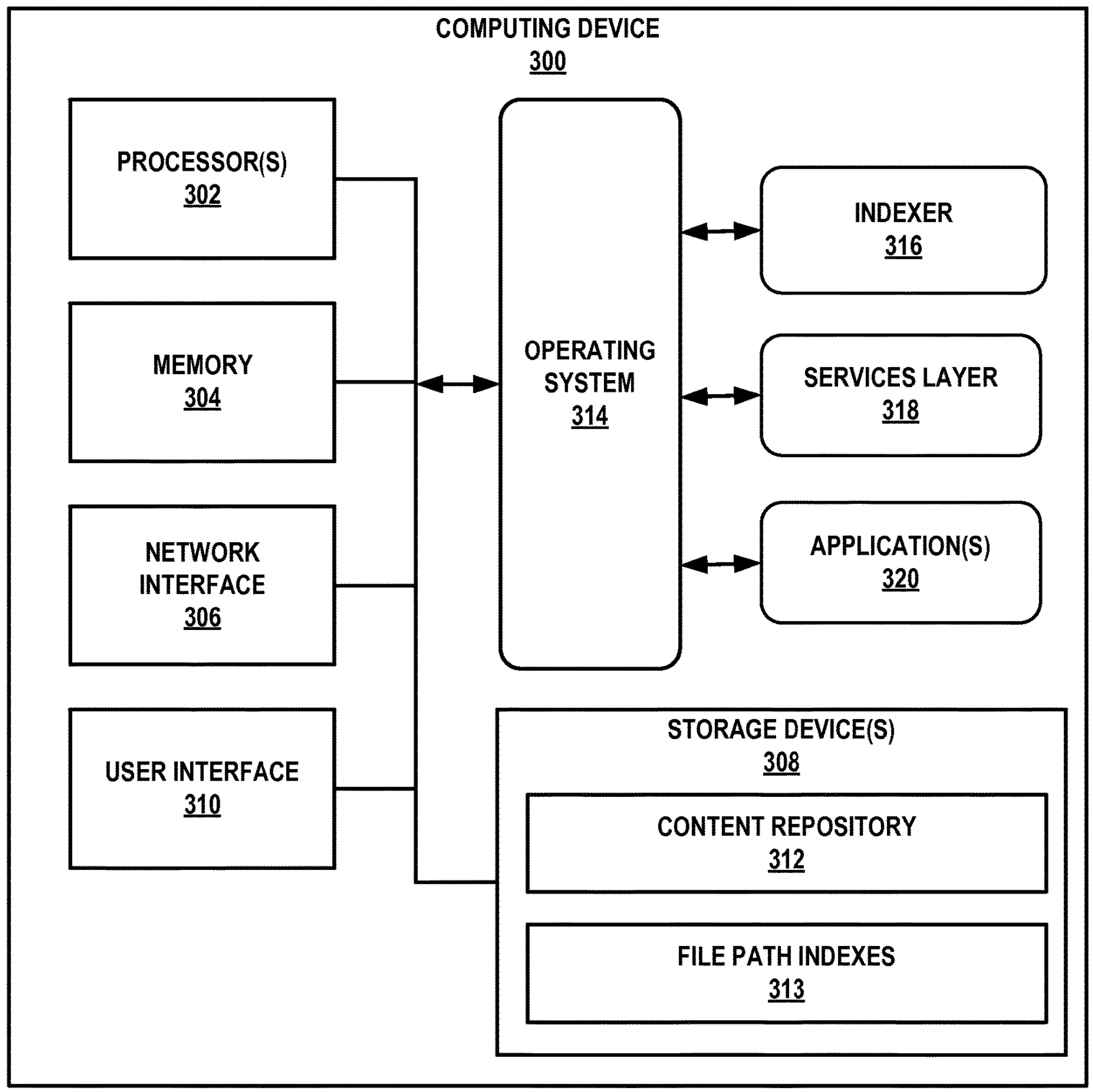
FIG. 3 is a block diagram illustrating an example computing device according to some aspects of the disclosure.

FIG. 3 is a block diagram illustrating an example computing device according to some aspects of the disclosure. As shown in FIG. 3, computing device 300 may be one of one or more computing devices that make up a computing system, such as computing system 100 shown in FIG. 1A.

Computing device 300 may include one or more processors 302, memory 304, a network interface 306, one or more storage devices 308, and user interface 310. Computing device 300 may also include an operating system 314, which may include modules and/or applications that are executable by processors 302 and computing device 300. Computing device 300, in one example, may also include indexer 316, services layer 318, and one or more applications 320, which all may be executable by one or more processors 302 of computing device 300. Each of components 302, 304, 306, 308, 310, 314, 316, 318, and 320 may be interconnected (physically, communicatively, and/or operatively) for inter-component communications.

Processors 302, in one example, may be configured to implement functionality and/or process instructions for execution within computing device 300. For example, processors 302 may be capable of processing instructions stored in memory 304, or instructions stored on storage devices 308. These instructions may define or otherwise control the operation of operating system 314, indexer 316, services layer 318, and one or more applications 320.

Memory 304 may, in one example, be configured to store information within computing device 300 during operation. Memory 304, in some examples, may be described as a computer readable storage medium. In some examples, memory 304 may be a temporary memory, meaning that a primary purpose of memory 304 is not long-term storage. Memory 304 may, in some examples, be described as a volatile memory, meaning that memory 304 does not maintain stored contents when computing device 300 is turned off. Examples of volatile memories may include random access memories (RAM), dynamic random access memories (DRAM), static random access memories (SRAM), and other forms of volatile memories known in the art. In some examples, memory 304 may be used to store program instructions for execution by processors 302. Memory 304 may, in one example, be used by software or applications running on computing device 300 (e.g., indexer 316) to temporarily store information during program execution.

Computing device 300 may, in some examples, also include network interface 306. Computing device 300 may, in one example, use network interface 306 to communicate with external devices via one or more networks. Network interface 306 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, computing device 300 may use network interface 306 to wirelessly communicate with an external device such as a server, mobile phone, or other networked computing device.

Storage devices 308 may, in some examples, also include one or more computer readable storage media. Storage devices 308 may be configured to store larger amounts of information than memory 304. Storage devices 308 may further be configured for long-term storage of information. In some examples, storage devices 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In some examples, storage devices 308 may include content repository 312, such as content repository 102 shown in FIG. 1A, and file path indexes 313, such as file path indexes 105 shown in FIG. 1A. Content repository 312 may include one or more data stores for storing digital content. In some examples, content repository 312 may not natively support file paths or folder trees. For example, content repository 312 may be a queryable repository, such as a relational database. In some examples, content repository 312 may be an enterprise repository. Content repository 312, in some examples, may include indexable content and non-indexable content. Indexable content may include data that may be represented as folder trees by services layer 318. Non-indexable content may include data that are not represented as folder trees by services layer 318. In some examples, file path indexes 313 may include a file path index indicating the file path for each file in a folder tree in indexable content of content repository 312, so that services layer 318 may, for example, enable one or more applications 320 to specify an item in content repository 102 by a file path that uniquely identifies the item in a folder tree. In some examples, file path indexes may be stored in content repository 312 and may be considered non-indexable content.

Computing device 300 may, in some examples, also include one or more user interfaces 310. User interface 310 may be configured to receive input from a user (e.g., tactile, audio, or video feedback). User interface 310 may include a touch-sensitive and/or a presence-sensitive screen, mouse, a keyboard, a voice responsive system, or any other type of device for detecting a command from a user. In some examples, user interface 310 may include a touch-sensitive screen, mouse, keyboard, microphone, or camera.

User interface 310 may also include, combined or separate from input devices, output devices. In this manner, user interface 310 may be configured to provide output to a user using tactile, audio, or video stimuli. In one example, user interface 310 may include a touch-sensitive screen, sound card, a video graphics adapter card, or any other type of device for converting a signal into an appropriate form understandable to humans or machines. In addition, user interface 310 may include a speaker, a cathode ray tube (CRT) monitor, a liquid crystal display (LCD), or any other type of device that can generate intelligible output to a user.

Computing device 300 may, in some examples, also include operating system 314. Operating system 314 may, in some examples, control the operation of components of computing device 300. For example, operating system 314 may, in one example, facilitate the interaction of indexer 316 with services layer 318, applications 320, processors 302, memory 304, network interface 306, storage device 408, and user interface 310.

Computing device 300 may, in some examples, further include indexer 316, which may be similar to indexer 106 shown in FIG. 1A. Indexer 316 may be an executable software application running on one or more processors 302 and stored in memory 304 or one or more storage devices 308. In some examples, indexer 316 may be configured to query content repository 312 stored in storage devices 308 for one or more items that qualify for file path indexes, do not have the file path indexes, and have a parent folder that has a file path index. In some examples, the querying may not depend on results from previous queries, and the file path index may indicate an associated item's location in a folder tree. Indexer 316 may also be configured to create the file path indexes for resulting items from the querying and to store the created file path indexes in file path indexes 313 in storage devices 308. Indexer 316 may also be configured to, if the querying results in at least one resulting item, repeat the querying of content repository 312 and the creating and storing of the file path indexes until the querying results in zero resulting items.

Computing device 300 may, in some examples, further include services layer 318, which may be similar to services layer 104 shown in FIG. 1A. Services layer 318 may be an executable software application running on one or more processors 302 and stored in memory 304 or one or more storage devices 308. In some examples, services layer 318 may be configured to provide services and interfaces to applications, such as one or more applications 320, for accessing data stored in content repository 312. In some examples, the services and interfaces provided by services layer 318 may include an application programming interface (API) that applications may use to access data stored in content repository 312. In some other examples, services layer 318 may provide web services that applications may use to access data stored in content repository 312 over the web.

In some examples, services layer 318 may also be configured to abstract items in content repository 312 so that they may appear as one or more folder trees to one or more applications. For example, services layer 318 may be configured to maintain file path indexes 313 that includes a file path index indicating the file path for files in a folder tree in content repository 312. The services and interfaces provided by services layer 318 may, for example, enable one or more applications to specify an item in content repository 312 by a file path that uniquely identifies the item in a folder tree.

Computing device 300 may, in some examples, further include one or more applications 320, such as one or more applications 108 and one or more applications 110 shown in FIG. 1A. One or more applications 320 may be an executable software application running on one or more processors 302 and stored in memory 304 or one or more storage devices 308. In some examples, one or more applications 320 may be configured to access items in content repository 312 via services layer 318. In some examples, one or more applications 320 may be configured to directly access items in content repository 312 without using services layer 318.

Any applications (e.g., indexer 316) implemented within or executed by computing device 300 may be implemented or contained within, operable by, executed by, and/or be operatively/communicatively coupled to components of computing device 300 (e.g., processors 302, memory 304, network interface 306, storage devices 308, and user interface 310).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various embodiments of the invention have been described. These and other embodiments are within the scope of the following claims.

The invention claimed is:

1. A method comprising:

maintaining file path indexes for file paths of items in a content repository, stored on at least one computer readable storage device, wherein the items in the content repository comprising one of indexable content and non-indexable content, wherein the items of indexable content comprise files and folders represented in a hierarchy of folders that are configured to have file path indexes to uniquely identify the files and the folders in the hierarchy of folders, and wherein the items of non-indexable content comprising files and folders not represented in the hierarchy of folders;

querying, by at least one processor, the content repository for a root folder and an unfiled folder tree, wherein an unfiled folder tree has items that do not have file path indexes;

creating file path indexes for items resulting from the query;

querying, by the at least one processor, the hierarchy of folders for an item that qualifies for a file path index by comprising indexable content, does not have a file path index, and resides in a folder that has a file path index; and creating, by the at least one processor, a file path index for the item resulting from the querying, wherein the created file path index indicates a location for the item in the hierarchy of folders.

2. The method of claim 1, wherein the content repository does not natively support file paths.

3. The method of claim 2, wherein the content repository comprises a relational database.

4. The method of claim 1, wherein a folder tree includes a plurality of folders and files in the hierarchy of folders returned as a result of the querying the hierarchy of folders.

5. The method of claim 1, wherein the querying the hierarchy of folders returns any files that qualify for a file path index, does not have a file path index, and are not more than a single level in the hierarchy of folders below a folder having a file path index.

6. The method of claim 5, wherein a further iteration of the querying the hierarchy of folders and creating a file path index are performed, in response to the creating the file path index, to determine whether there are any further files below the files in the hierarchy of folders returned in response to the query that do not have a file path index and that qualify for a file path index.

7. A non-transitory computer readable storage device containing instructions that, when executed on at least one programmable processor, cause the at least one programmable processor to perform operations comprising:

maintaining file path indexes for file paths of items in a content repository, stored on at least one computer readable storage device, wherein the items in the content repository comprising one of indexable content and non-indexable content, wherein the items of indexable content comprise files and folders represented in a hierarchy of folders that are configured to have file path indexes to uniquely identify the files and the folders in the hierarchy of folders, and wherein the items of non-indexable content comprising files and folders not represented in the hierarchy of folders;

querying, by at least one processor, the content repository for a root folder and an unfiled folder tree, wherein an unfiled folder tree has items that do not have file path indexes;

creating file path indexes for items resulting from the query;

querying, by the at least one processor, the hierarchy of folders for an item that qualifies for a file path index by comprising indexable content, does not have a file path index, and resides in a folder that has a file path index; and creating, by the at least one processor, a file path index for the item resulting from the querying, wherein the created file path index indicates a location for the item in the hierarchy of folders.

8. The non-transitory computer readable storage device of claim 7, wherein the content repository does not natively support file paths.

9. The non-transitory computer readable storage device of claim 8, wherein the content repository comprises a relational database.

10. The non-transitory computer readable storage device of claim 7, wherein a folder tree includes a plurality of folders and files in the hierarchy of folders returned as a result of the querying.

11. The non-transitory computer readable storage device of claim 7, wherein the querying returns any files that qualify for a file path index, does not have a file path index, and are not more than a single level in the hierarchy of folders below a folder having a file path index.

12. The non-transitory computer readable storage device of claim 11, wherein a further iteration of the operations of querying the hierarchy of folders and creating a file path index are performed, in response to the creating the file path index, to determine whether there are any further files below the files in the hierarchy of folders returned in response to the query that do not have a file path index and that qualify for a file path index.

13. A computing system comprising:

one or more processors; and an indexer operable on the one or more processors and configured to:

maintain file path indexes for file paths of items in a content repository, stored on at least one computer readable storage device, wherein the items in the content repository comprising one of indexable content and non-indexable content, wherein the items of indexable content comprise files and folders represented in a hierarchy of folders that are configured to have file path indexes to uniquely identify the files and the folders in the hierarchy of folders, and wherein the items of non-indexable content comprising files and folders not represented in the hierarchy of folders;

querying, by at least one processor, the content repository for a root folder and an unfiled folder tree, wherein an unfiled folder tree has items that do not have file path indexes;

creating file path indexes for items resulting from the query;

query the hierarchy of folders representing for an items that qualifies for a file path index by comprising indexable content, does not have a file path index, and resides in a folder that has a file path index; and create a file path index for the item resulting from the query, wherein the created file path index indicates a location for the item in the hierarchy of folders.

14. The computing system of claim 13, wherein the content repository does not natively support file paths.

15. The computing system of claim 14, wherein the content repository comprises a relational database.

16. The computing system of claim 13, wherein a folder tree includes a plurality of folders and files in the hierarchy of folders returned as a result of the querying.

17. The computing system of claim 13, wherein the querying returns any files that qualify for a file path index, does not have a file path index, and are not more than a single level in the hierarchy of folders below a folder having a file path index.

18. The computing system of claim 17, wherein a further iteration of the querying the hierarchy of folders and creating a file path index are performed, in response to the creating the file path index, to determine whether there are any further files below the files in the hierarchy of folders returned in response to the query that do not have a file path index and that qualify for a file path index.

* * * * *